US012675653B2

(12) United States Patent
Chang et al.

(10) Patent No.: US 12,675,653 B2
(45) Date of Patent: Jul. 7, 2026

(54) CROSS-LINGUAL DOCUMENT ANALYSIS AND TRANSLATION SYSTEM

(71) Applicant: Schlumberger Technology Corporation, Sugar Land, TX (US)

(72) Inventors: Xiqing Chang, Clamart (FR); Tianjun Hou, Clamart (FR); Zheng Zhang, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 188 days.

(21) Appl. No.: 18/649,547

(22) Filed: Apr. 29, 2024

(65) Prior Publication Data

US 2024/0403572 A1     Dec. 5, 2024

Related U.S. Application Data

(60) Provisional application No. 63/499,018, filed on Apr. 28, 2023.

(51) Int. Cl.
*G06F 40/58* (2020.01)

(52) U.S. Cl.
CPC .................................... *G06F 40/58* (2020.01)

(58) Field of Classification Search
USPC ....................................................... 704/2–7
See application file for complete search history.

(56) References Cited

U.S. PATENT DOCUMENTS

| | | | | | |
|---|---|---|---|---|---|
| 12,493,717 | B2 * | 12/2025 | Pabolu | ................ | G06F 21/6254 |
| 2004/0102957 | A1 * | 5/2004 | Levin | .................... | H04L 51/066 704/3 |
| 2022/0318255 | A1 * | 10/2022 | Fei | .................... | G06F 16/24578 |
| 2023/0153542 | A1 * | 5/2023 | Niu | ......................... | G06F 40/45 704/8 |
| 2023/0274102 | A1 * | 8/2023 | Marie | .................... | G06F 40/44 704/2 |
| 2024/0087752 | A1 * | 3/2024 | Rutowski | ................ | G16H 80/00 |
| 2024/0330603 | A1 * | 10/2024 | Tu | ........................... | G06F 40/47 |

FOREIGN PATENT DOCUMENTS

| | | | | |
|---|---|---|---|---|
| CN | 201440584772 A | * | 10/2014 | ........... G06F 16/986 |

OTHER PUBLICATIONS

Xu, Y. et al., "LayoutXLM: Multimodal Pre-training for Multilingual Visually-rich Document Understanding", Computation and Language, arXiv:2104.08836, Sep. 9, 2021, 10 Pages.

* cited by examiner

*Primary Examiner* — Leonard Saint-Cyr
(74) *Attorney, Agent, or Firm* — Kyle R. Milller

(57) ABSTRACT

Systems and methods for providing a cross-lingual PDF analysis and translation system specifically designed for the energy industry. The cross-lingual PDF analysis and translation system uses various methods (e.g., tag-based or paragraph-based document extraction and mixing) to create a cross-lingual mixed document dataset by modifying HTML files from multilingual web pages. The cross-lingual mixed document dataset is used to retrain a LayoutXLM model, enabling the LayoutXLM model to further build cross-lingual relations by evaluating the model on various form understanding benchmarks.

14 Claims, 8 Drawing Sheets

CROSS-LINGUAL DOCUMENT ANALYSIS AND TRANSLATION SYSTEM

CROSS REFERENCE

This application claims the benefit of U.S. Provisional Application No. 63/499,018, entitled "A CROSS-LINGUAL DOCUMENT ANALYSIS AND TRANSLATION SYSTEM," filed Apr. 28, 2023, the disclosure of which is hereby incorporated herein by reference.

FIELD OF THE INVENTION

Aspects of the disclosure relate to systems and methods for reading and analyzing domain-specific documents. More specifically, aspects of the disclosure provide for using a document analysis and translation system to process domain-specific documents generated in different languages.

BACKGROUND INFORMATION

Reading and analyzing large and complex documents may be a challenging and time-consuming task. For example, some documents may include contents in different languages that may result in difficulties (e.g., language barriers) for certain users. Some documents may include domain-specific contents (e.g., technical terminology, special vocabularies, formats, and/or expressions) that may create challenges for certain users unfamiliar with certain domain-specific knowledge. Therefore an intelligent document analysis system may be desired for the users to better understand the large and complex documents with reduced reading time and improved understanding of document contents.

SUMMARY

A summary of certain embodiments described herein is set forth below. It should be understood that these aspects are presented merely to provide the reader with a brief summary of these certain embodiments and that these aspects are not intended to limit the scope of this disclosure. In one non-limiting embodiment, a system may include a network interface to retrieve a first set of multilingual documents and a second set of multilingual documents. The system may also include a document generation component to generate a cross-lingual mixed document based on the first set of multilingual documents. The system may further include an artificial intelligence (AI) driven document processing component to retrain a pre-trained machine learning model to learn cross-lingual relations based on the cross-lingual mixed document and translate the second set of multilingual documents based on the cross-lingual relations. Additionally, the system may include one or more task-specific components to complement the AI-driven document processing component to implement one or more specific tasks.

BRIEF DESCRIPTION OF THE DRAWINGS

Various aspects of this disclosure may be better understood upon reading the following detailed description and upon reference to the drawings, in which.

DETAILED DESCRIPTION

Figure 1:
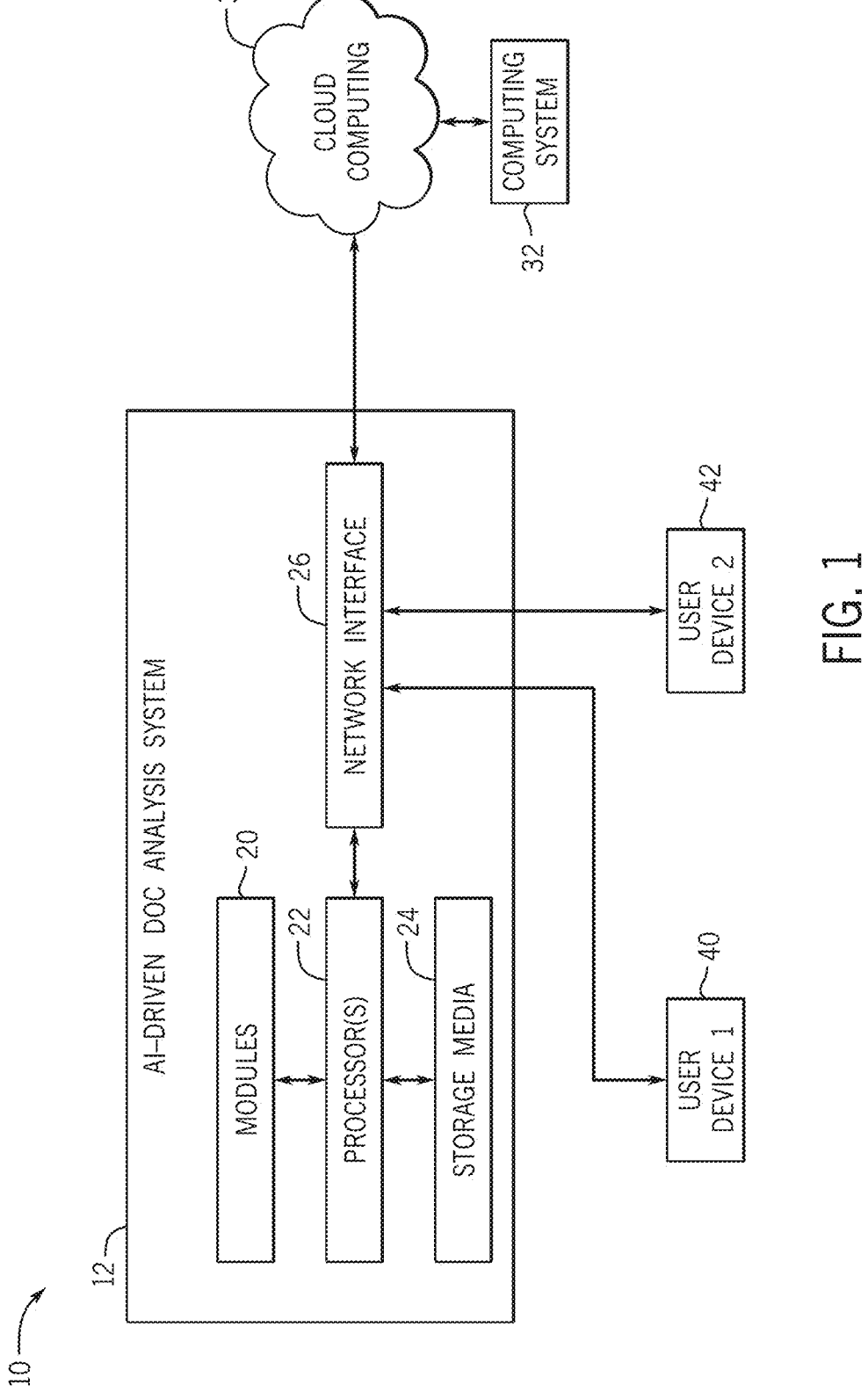
FIG. 1 depicts a schematic diagram of a document processing framework including an Artificial Intelligent (AI) driven document analysis system, in accordance with embodiments of the present disclosure.

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first", "second" and other numerical terms, when used herein, do not imply a sequence or order unless clearly indicated by the context. Thus, a first element, component, region, layer, or section discussed herein could be termed a second element, component, region, layer, or section without departing from the teachings of the example embodiments.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As use of electronic documents becomes prevalent, users may have new challenges in reading and understanding large and complex documents having sophisticated contents. Such documents may include various contents generated in different languages (e.g., English, French, Spanish), covering domain-specific contents (e.g., technical terminology, special vocabularies, formats, and/or expressions associated with specific domains and/or fields), having contextual meanings (e.g., different interpretations in different environment/conditions), and the like. The large and complex documents may create certain difficulties for the users, such as language barriers, lack of domain-specific knowledge, contextual misinterpretations, and so on.

To obviate the difficulties of reading and understanding the large and complex documents, the users may desire to use intelligent document analysis systems to better understand the large and complex documents with reduced reading time and improved understanding accuracy. Certain artificial intelligence (AI) based document analysis tools has shown great potential in extracting and classifying information from unstructured documents. Deep learning based methods (e.g., CNN, GANS, Transformers) have emerged and outperformed traditional rule-based or template-based methods in terms of accuracy and migration capability. Such artificial intelligence (AI) based document analysis tools may use multi-modal models to process a variety of documents that may include various structures and layouts. For example, the multi-modal models may include multiple modalities to process the documents with different textual, visual and layout information, breaking certain barriers (e.g., language barrier, domain barrier) in document analysis tasks.

Certain artificial intelligence (AI) research and development on document analysis are moving forward in two perspectives: 1) from monolingual to multilingual, which makes it feasible to use one single system to understand documents in different languages; 2) from single data type (e.g., text-only data) to multiple data modalities (i.e. text, images, tables, formulations). For example, certain multilingual multi-modal AI tools may utilize pre-trained large-scale transformer models (e.g., LayoutLM model, Layout-LMv2 model) having multiple modalities, such as textual, visual, and layout information, to analyze different types of documents, including emails, forms, receipts, PDF files, Excel files, and so on. Such documents may include scanned and/or digital versions.

However, the multilingual multi-modal AI tools described above may have limitations when analyzing certain documents having domain-specific contents. For example, certain documents may include large amounts of information in energy industry domain, such as technical reports, financial documents, and regulatory filings generated in different languages associated with fossil fuel extraction and processing industry, electrical power generation and distribution industry, nuclear power industry, renewable energy industry, and so on. Such domain-specific documents may be difficult for the multilingual multi-modal AI tools described above to analyze with desired accuracy (e.g., with respect to translation, interpretation). For example, the multilingual multi-modal AI tools described above may have limited ability to accurately analyze and interpret the multilingual energy domain-specific documents, which may include large amount of energy-related terminology and vocabularies, complex diagrams and tables, specialized formatting, notations, formulations, and expressions, and the like.

To alleviate such difficulty associated with domain-specific documents, the embodiments in present disclosure provide an AI-driven document analysis system oriented to the energy industry domain. The system may read, understand, and extract specific information (e.g., energy-related information) from various documents in different languages. Based on the extracted information, the system may generate training data (e.g., multilingual mixed document) and use the training data to retrain models (e.g., pre-trained LayoutXLM models). The retrained models may have improved or new functionalities that may reduce human effort on document reading and information searching process and facilitate problem solving and decision making process. For instance, with the multilingual support, the system may enable document translations among different languages and break down language barriers for domain experts from different countries and regions. Moreover, the system may extend the multilingual multi-modal AI models to the energy industry domain, thereby enabling analysis on energy industry domain-specific documents in different languages. The system may reduce user dependency on domain-specific knowledge and experience and facilitate the users to make enhanced data driven decisions based on better understanding of the documents.

Although the domain-specific documents described herein are related to the energy industry domain, it should be noted that, in other embodiments, the AI-driven document analysis system may process other domain-specific documents using the models (e.g., LayoutXLM models or other suitable models) retrained by other domain-specific training data.

The AI-driven document analysis system includes various functionalities for analyzing and interpreting energy industry domain-specific documents (e.g., PDF files) in various languages. The multilingual multi-modal AI tools described above may be restricted to general domain and may not be transferred directly for domain-specific use cases. For example, the existence of massive energy-related vocabularies and specific expressions may lead to inaccurate understanding and/or interpretation. To break such restrictions, the AI-driven document analysis system in present disclosure may utilize documents from energy field (e.g., oil and gas field, renewable energy field) to re-train the pre-trained models to improve model learning capability for better understanding the energy field specific language (e.g., terminology, expression, format). Moreover, in order to further improve the model learning capability to process multilingual documents, the AI-driven document analysis system may utilize a mixed document (e.g., a multilingual mixed document) as training data. For example, the mixed document may include contents extracted from different source documents in multiple languages. The AI-driven document analysis system may utilize the mixed document for model training to improve the model learning capability of certain correspondences between words with the same meaning but in different languages (or with same spelling but different meanings), thereby enhancing the system's cross-lingual comprehension competence.

In certain embodiments, the AI-driven document analysis system in present disclosure may include a cross-lingual PDF analysis and translation system specifically designed to handle unique characteristics of PDF documents in the energy industry domain. The PDF analysis and translation system may be trained on a large corpus of energy industry domain-specific documents in multiple languages, enabling the system to accurately understand nuances of the energy industry. After the training, the cross-lingual PDF analysis and translation system may analyze various energy industry multilingual domain-specific documents having mixed technical terminology, complex diagrams, and specialized formatting, resulting in translated and interpreted information with desired accuracy and easiness for understanding.

With the proceeding in mind, FIG. 1 depicts a schematic diagram of a document processing framework 10 including an Artificial Intelligent (AI) driven document analysis system 12. The document processing framework 10 may utilize the AI-driven document analysis system 12 to analyze various types of documents (e.g., scanned and/or digital versions), such as emails, forms, receipts, PDF files, Excel files, and so on. In certain embodiments, the documents may include the energy industry multilingual domain-specific documents. In certain embodiments, the AI-driven document analysis system 12 may use a cross-lingual PDF analysis and translation system specifically designed for the energy industry to process PDF files including energy industry multilingual domain-specific contents (e.g., energy field terminology and vocabularies, complex diagrams and tables, specialized formatting, notations, formulations, and expressions).

The AI-driven document analysis system 12 may include analysis modules 20 (e.g., modules including programs of computer-executable instructions and associated data) that may be configured to perform various functions of the embodiments described herein. In certain embodiments, to perform these various functions, the analysis modules 20 may execute on one or more processors 22, which may be connected to one or more storage media 24. Indeed, in certain embodiments, the analysis modules 20 may be stored in the one or more storage media 24.

In certain embodiments, the computer-executable instructions of the analysis modules 20, when executed by the one or more processors 22, may cause the one or more processors 22 to implement or generate one or more models (e.g., LayoutXLM models or other suitable models). Such models may be used by the AI-driven document analysis system 12 to analyze, translate, and interpret the energy industry multilingual domain-specific documents.

In certain embodiments, the one or more processors 22 may include a microprocessor, a microcontroller, a processor module or subsystem, a programmable integrated circuit, a programmable gate array, a digital signal processor (DSP), or another control or computing device. In certain embodiments, the one or more processors 22 may include artificial intelligence (AI) based processors (e.g., using machine learning, neural network). In certain embodiments, the one or more storage media 24 may be implemented as one or more non-transitory computer-readable or machine-readable storage media. In certain embodiments, the one or more storage media 24 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

In certain embodiments, the computer-executable instructions and associated data of the analysis modules 20 may be provided on one computer-readable or machine-readable storage medium of the one or more storage media 24, or alternatively, may be provided on multiple computer-readable or machine-readable storage media distributed in a large system having possibly plural nodes. Such computer-readable or machine-readable storage medium or media are considered to be part of an article (or article of manufacture), which may refer to any manufactured single component or multiple components. In certain embodiments, the one or more storage media 24 may be located either in the machine running the machine-readable instructions or may be located at a remote site from which machine-readable instructions may be downloaded over a network for execution.

In certain embodiments, the one or more processors 22 may be connected to a network interface 26 of the AI-driven document analysis system 12 to allow one or more processors 22 to communicate data (e.g., the energy industry multilingual domain-specific documents) with one or more cloud computing resources 30 (e.g., cloud-based servers, databases), which may in turn communicate with external computing systems 32 (e.g., servers) to access and/or to remotely interact with external data sources that may provide the energy industry multilingual domain-specific documents. In certain embodiments, the AI-driven document analysis system 12 may use the network interface 26 to access the one or more cloud computing resources 30 to retrieve the one or more models (e.g., LayoutXLM models or other suitable models) and retrain the models using the training data described herein.

Additionally, the AI-driven document analysis system 12 may use the network interface 26 to communicate with user devices (e.g., mobile phones, laptop computers, desktop computers, tablets), such as a first user device 40 associated with a first user and the second user device 42 associated with a second user. For instance, the first user may be familiar with certain document contents of the energy industry multilingual domain-specific documents in a first language (e.g., English) but unfamiliar with other document contents in a second language (e.g., French), and the second user may be familiar with the other document contents in the second language (e.g., French) but unfamiliar with the document contents in the first language (e.g., English). The AI-driven document analysis system 12 may utilize the retrained models to facilitate the first and second users to better understand the document contents in multilingual languages and make enhanced data driven decisions based on better understanding of the document contents via user devices 40 and 42, respectively.

It should be appreciated that the AI-driven document analysis system 12 illustrated in FIG. 1 is only one example of the document processing framework 10, and that the AI-driven document analysis system 12 may have more or fewer components than shown, may combine additional components not depicted in the embodiment of FIG. 1, and/or the AI-driven document analysis system 12 may have a different configuration or arrangement of the components depicted in FIG. 1. In addition, the various systems and components illustrated in FIG. 1 may be implemented in hardware, software, or a combination of both hardware and software, including one or more signal processing and/or application specific integrated circuits. Furthermore, the operations of the AI-driven document analysis system 12 as described herein may be implemented by running one or more functional modules in an information processing apparatus such as application specific chips, such as application-specific integrated circuits (ASICs), field-programmable gate arrays (FPGAs), programmable logic devices (PLDs), systems on a chip (SOCs), or other appropriate devices. These modules, combinations of these modules, and/or their combination with hardware are all included within the scope of the embodiments described herein.

Figure 2:
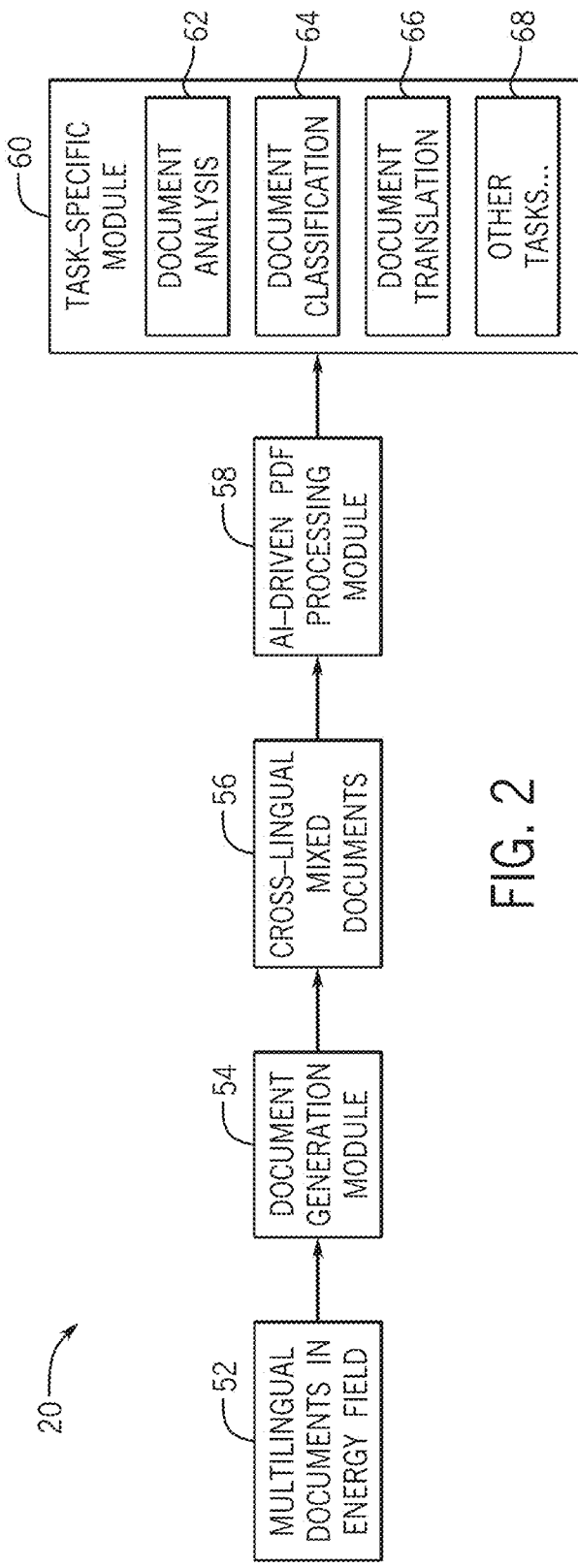
FIG. 2 depicts a block diagram of analysis modules of the AI-driven document analysis system implemented in the document processing framework of FIG. 1, in accordance with embodiments of the present disclosure.

With these in mind, FIG. 2 depicts a block diagram of the analysis modules 20 of the AI-driven document analysis system 12 implemented in the document processing framework 10 of FIG. 1. The AI-driven document analysis system 12 may receive multilingual documents in energy field 52 (e.g., via the network interface 26) from one or more data sources (e.g., the one or more cloud computing resources 30). The multilingual documents in energy field 52 may include various types of energy industry multilingual domain-specific documents, such as emails, forms, receipts, PDF files, Excel files, and other types of scanned and/or digital versions of documents. The energy industry multilingual domain-specific documents may include energy industry multilingual domain-specific contents, such as mixed technical terminology, complex diagrams, specialized formatting, tables with special units/notations, and so forth.

The analysis modules 20 may include a document generation module 54 that may utilize the multilingual documents in energy field 52 to generate cross-lingual mixed documents 56. For example, the document generation module 54 may use the multilingual documents in energy field 52 that include individual documents (e.g., PDF files) with same/similar contents but in different languages to generate the cross-lingual mixed documents 56. Each of the cross-lingual mixed documents 56 may include document contents in several languages. For instance, a first portion (e.g., words, sentences, paragraphs) of a cross-lingual mixed document may be in English, and a second portion (e.g., words, sentences, paragraphs) of the cross-lingual mixed documents 56 may be in French. In certain embodiments, the first portion and the second portion may be mixed with each other. For example, a sentence may include words in both English and French, and a paragraph may include sentences in both English and French.

In an embodiment, the document generation module 54 may use a pair of documents in an English version and a French version, respectively. The document generation module 54 may extract all of the contents (e.g., text contents) from the English version and replace (e.g., randomly) a portion of the contents with corresponding contents from the French version, generating the cross-lingual mixed documents 56. Such mixing process (e.g., content shuffle) may facilitate the AI-driven document analysis system 12 to map correspondences (or correlations) of the contents (e.g., words, sentences) with same contexts but in different languages. The mixing process may be flexible from paragraph level to sentence level, or word level. In this way, the This document generation module 54 may generate a new document (e.g., the cross-lingual mixed documents 56) by mixing documents in multiple languages to facilitate the AI-driven document analysis system 12 to better understand the correspondences of the contents in different languages.

The analysis modules 20 may also include an AI-driven PDF processing module 58 that may utilize multimodal Natural Languages Processing (NLP) technique (e.g., LayoutXLM) to learn (e.g., via machine learning and/or neural network) cross-lingual relations based on textual information from the cross-lingual mixed documents 56 in PDF format, as well as certain extracted layout information (e.g., from the multilingual documents in energy field 52), such as position, size, and orientation information of texts, images, and other elements (e.g., formulations, tables). The AI-driven PDF processing module 58 may learn from a large corpus of cross-lingual mixed documents (e.g., the cross-lingual mixed documents 56) generated by the document generation module 54, allowing the AI-driven document analysis system 12 to accurately understand the nuances of energy industry and automatically represent certain unique characteristics of PDF documents by a machine-readable format. Such learning process may also be referred to as a training process in present disclosure. After the training process, the AI-driven PDF processing module 58 may analyze, translate, and interpret various multilingual energy industry domain-specific PDF documents based on learning results (e.g., textual information, layout information).

The analysis modules 20 may further include task-specific modules 60 to complement the AI-driven PDF processing module 58 and to implement certain specific tasks (e.g., user-defined tasks). The task-specific modules 60 may include several sub-modules (or blocks) that may flexibly adapt to various tasks defined by a user. For example, the task-specific modules 60 may include a document analysis block 62 to identify and extract certain specific information from PDF documents (e.g., multilingual energy industry domain-specific PDF documents). The specific information may include energy domain-specific contents, such as energy field terminology and vocabularies, complex diagrams and tables, specialized formatting, notations, formulations, and expressions, and so on. The extracted specific information may be stored in a structured format, such as a database or a spreadsheet.

In one embodiment, an English version of an energy industry domain-specific PDF document may include notations and/or symbols representing unique meanings specialized in the energy industry. For example, the English version of an energy industry domain-specific PDF document may include length/distance measurement in inch. In certain portions (e.g., tables), the unit of inch may be represented using a notation 'in' (instead of using 'inch'). The document analysis block 62 may identify such special notation and properly interpret it as inch, instead of misinterpreting it as a preposition. In a different case, the unit of inch may be represented using a double prime symbol (or a double quote symbol). The document analysis block 62 may identify such special symbol and properly interpret it as inch, instead of misinterpreting it as a punctuation.

In one embodiment, an English version of an energy industry domain-specific PDF document may include terminology and vocabularies specialized in the energy industry. For example, the English version of an energy industry domain-specific PDF document may include a terminology word 'pig' (or pipeline pig) that stands for 'pipeline intervention gadget' (e.g., a device used to clean or inspect pipelines in oil and gas operations). The document analysis block 62 may identify such terminology word and properly interpret it as a device, instead of misinterpreting it as a type of animal.

The task-specific modules 60 may also include a document classification block 64 to assign one or more predefined categories or classes for each document of the multilingual energy industry domain-specific PDF documents. The document classification block 64 may facilitate the AI-driven document analysis system 12 in various applications, such as organizing large collections of energy industry domain-specific documents, filtering irrelevant or spam documents, and automatically routing documents to the appropriate sections or users within an organization (e.g., an oil and gas company).

Moreover, the task-specific modules 60 may include a document translation block 66. The document translation block 66 may select one or several target languages based on certain criteria, such as user's preferences or languages of the multilingual energy industry domain-specific PDF documents. The document translation block 66 may then apply the AI-driven PDF processing module 58 to translate each of the multilingual energy industry domain-specific PDF documents into the respective target language with the same or similar structured layout (e.g., position, size, and orientation information of texts, images, and other elements). The document translation block 66 may facilitate defining and implementing more specific document-related tasks (e.g., requested by the user).

Additionally, or alternatively, the task-specific modules 60 may include other task-specific blocks 68 for various specific tasks associated with the AI-driven document analysis system 12 in various applications. For example, the other task-specific blocks 68 may include an output block that may output the translated and interpreted multilingual energy industry domain-specific PDF documents (e.g., in target languages) to a database (e.g., in storage media 24) such that authorized users may access the output documents using devices (e.g., user devices 40 and 42) via a secured manner (e.g., the network interface 26).

It should be appreciated that the analysis modules 20 of the AI-driven document analysis system 12 illustrated in FIG. 2 is only one example of the AI-driven document analysis system 12, and that the AI-driven document analysis system 12 may have more or fewer modules than shown, may combine additional modules not depicted in the embodiment of FIG. 2, and/or the AI-driven document analysis system 12 may have a different configuration or arrangement of the modules depicted in FIG. 2. For example, the AI-driven document analysis system 12 may use different input and/or output modules to generate the training data (e.g., the cross-lingual mixed documents 56), analyze and interpret the multilingual energy industry domain-specific PDF documents. These modules, combinations of these modules, and/or their combination with hardware are all included within the scope of the embodiments described herein.

As mentioned above, the AI-driven document analysis system 12 may process domain-specific documents using the LayoutXLM model (or other suitable models) retrained by energy industry domain-specific training data (e.g., the cross-lingual mixed documents 56). With the preceding in mind, certain technologies and terms, such as those related to the LayoutXLM model, are provided below to impart additional familiarity and understanding with multilingual document analysis tasks and provide useful real-world context for other aspects of the present disclosure.

The LayoutXLM model is classified as one of software over-the-air (SOTA) multimodal document AI models. SOTA includes a variety of methods to distribute new versions of applications and operating systems for various devices (e.g., smartphones, mobile phones, routers) with the use of wireless connection (e.g., Wi-Fi, LTE, 4G or Bluetooth). The LayoutXLM model may be used in various multilingual document analysis tasks. However, pretraining data used to train the LayoutXLM model may not include cross-lingual parallel data (e.g., cross-lingual mixed training data such as the cross-lingual mixed documents 56), causing the pre-trained LayoutXLM model unsuitable for cross-lingual tasks (e.g., lack of learning language correspondence relationships). In certain cases, the LayoutXLM model may be pre-trained on large amount of documents (e.g., about 30 million digital-born or scanned documents in 53 different languages). However, the LayoutXLM model may be pretrained independently on each document as well as on each language during pre-training processes, therefore may not accurately learn certain cross-lingual interrelations, such as words with similar meanings across different languages.

Moreover, the pretraining data may be prepared in a general domain but not in a specific domain (e.g., energy industry domain) associated with the documents analyzed by the pre-trained LayoutXLM model, thereby inhibiting the pre-trained LayoutXLM model to accurate understand and interpret domain-specific document contents (e.g., specialized contents in energy industry field).

To obviate the difficulties described above with respect to using the pre-trained models (e.g., the LayoutXLM model) for processing cross-lingual energy industry domain-specific documents, the AI-driven document analysis system 12 may utilize a cross-lingual mixed training corpus and the LayoutXLM model retrained with the cross-lingual parallel data (e.g., the cross-lingual mixed documents 56 generated based on the cross-lingual mixed training corpus) to further improve the accuracy of c in processing the cross-lingual energy industry domain-specific documents. For example, the AI-driven document analysis system 12 may use the cross-lingual mixed documents 56 to retrain the pre-trained LayoutXLM model. Each document of the cross-lingual mixed documents 56 may include texts from both source and target languages, such that the LayoutXLM model may learn the cross-lingual interrelations (e.g., cross-lingual semantic information across the words, sentences, or paragraphs with similar meanings in different languages) with improved accuracy and efficiency.

For certain Natural Languages Processing (NLP) tasks, parallel data (e.g., the cross-lingual parallel data) including aligned sentence pairs, may be leveraged to facilitate training a word embedding model or a machine translation model and enable building better cross-lingual context. Based on a parallel corpus (e.g., the cross-lingual mixed training corpus), various methods may be used to align a word embedding space across different languages.

In one embodiment, a mapping-based method may include using the word embedding model or the machine translation model aim to learn a transformation that may map monolingual representation spaces into a common cross-lingual representation space. In one embodiment, a method based on pseudo-bilingual corpora may include using word alignment information of the parallel data to construct a pseudo-bilingual corpora by replacing an arbitrary number of words in the source language with their translations in another target language. In one embodiment, a joint model may have a cross-lingual regularization term to the monolingual objective function to jointly optimize monolingual and cross-lingual loss during the training.

The methods described above for aligning cross-lingual embedding space may be generalized for document understanding tasks in the AI-driven document analysis system 12. For example, the AI-driven document analysis system 12 may use the cross-lingual mixed training corpus as a starting point and go further from document-aligned level to paragraph level, sentence level, or even word level. In certain cases, a document may have a certain length and format such that it may be difficult to align the document at the sentence level and concatenate sentence-aligned pairs as machine translation tasks usually do for text-only data. In such cases, the AI-driven document analysis system 12 may use a generalized method for generating cross-lingual mixed documents (e.g., the cross-lingual mixed documents 56), in which document contents in two or more languages are included in one document, enabling the LayoutXLM model better learn cross-lingual document representations.

To generate the cross-lingual mixed documents, the AI-driven document analysis system 12 may use an open-source dataset (e.g., Workshops on statistical Machine Translation (WMT-16) including bilingual document alignment shared task), which includes a set of 1624 aligned English-French website URL pairs including their corresponding HTML documents from 49 web domains. Webpages corresponding to such websites include certain similar components such as menus, tables, images, and split paragraphs as the other types of document files (e.g., PDFs, Excels). In the open-source dataset, textual contents may be extracted and modified freely from original HTML structures of the HTML documents. In addition, the HTML documents may be easily converted into different document types (e.g., PDFs or images).

Considering the existence of a large amount of multilingual parallel webpages on the internet, the generalized method for generating cross-lingual mixed documents based on HTML documents may be reused and promoted for additional HTML documents that may be crawled from the web, thereby increasing the data diversity of the training data used to retrain the LayoutXLM model.

In the open-source dataset, each HTML document may correspond to a document tree. Based on parallel bilingual HTML pairs of WMT-16, the AI-driven document analysis system 12 may extract text contents from a source HTML tree and randomly replace a portion of extracted text contents with corresponding text contents from a target HTML tree, thereby generating a cross-lingual mixed document with two different languages (e.g., English and French). Such content shuffle may improve mapping words with similar contexts among different languages into one single cross-lingual embedding space.

Figure 3:
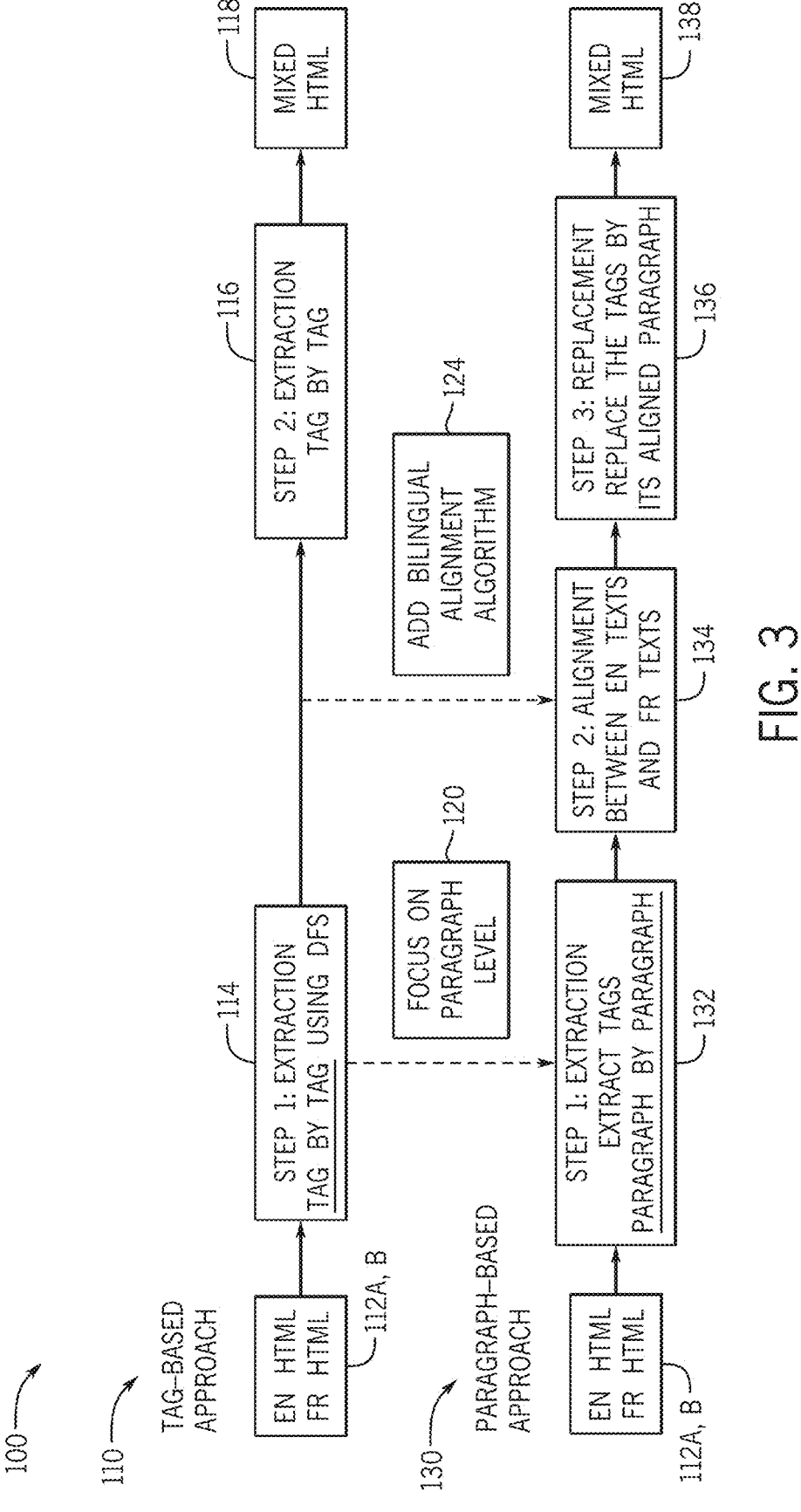
FIG. 3 depicts block diagrams of a tag-based method and a paragraph-based method for extracting and replacing text contents based on source and target documents, in accordance with embodiments of the present disclosure.

With this in mind, the AI-driven document analysis system 12 may use different methods (or processes) for text content extraction and replacement. FIG. 3 depicts block diagrams of a tag-based method 110 and a paragraph-based method 130 for extracting and replacing text contents based on source and target documents. For example, the source and target documents may include source and target HTML documents 112A, B. The source and target HTML documents 112A, B may correspond to source and target languages (e.g., English and French, respectively) retrieved from the open-source dataset including the set of 1624 aligned English-French website URL pairs from 49 web domains.

An HTML document may be composed of a tree of HTML nodes, such as text nodes and HTML elements, which may add semantics and formatting to parts of the HTML document (e.g., make text bold, organize text into paragraphs, lists and tables, or embed hyperlinks and images). Each HTML element may have HTML attributes specified.

For webpage pairs (e.g., associated with the aligned English-French website URL pairs) sharing the same HTML structure (e.g., HTML trees), the tag-based method 110 may be used to extract text contents tag by tag from the source and target language (e.g., English and French, respectively) based on existing HTML structures of the source and target documents 112A, B. Next, a random portion of each document may be swapped. Certain examples of webpage pairs having same or similar HTML structures will be illustrated in following sections with respect to FIG. 4.

The tag-based method 110 may start with source and target HTML documents 112A, B. The tag-based method

110 may iterate simultaneously through all nodes of both source and target HTML document trees and extract tag by tag (at block 114) to construct a collection of aligned text pairs T. For each aligned text pairs (e.g., source text $t_s$, target text $t_t$), the tag-based method 110 may replace $t_s$ by $t_t$ tag by tag (at block 116) with an assigned exchange probability less than a predefined threshold p, where $p \in [0, 1]$. After replacement, the tag-based method 110 may generate a mixed HTML document (at block 118).

In certain cases, implementations of the tag-based method 110 may depend on certain preconditions. For example, a tree structure of the source HTML document may be the same as that of the target HTML document. Such precondition may ensure that the English texts and the French texts extracted under the nodes at the same position in corresponding HTML trees have semantically corresponding content. However, such precondition may be difficult to maintain for multilingual HTML files directly crawled from the web for the following reasons.

In some cases, contents of a source language webpage may not correspond exactly to contents of the target language webpage. For example, the presence of some added or missing parts make it challenging to directly extract aligned text pairs through the tag-based method 110. Certain examples will be illustrated in following sections with respect to FIG. 5.

In some cases, translations among different languages may have one-to-one sentence/paragraph correspondences. In other cases, the translations may also have one-to-many, many-to-one, or many-to-many sentence/paragraph correspondences. This may make the amount of text extracted from the source tree differ from that of the target tree.

In some cases, use of formatting tags in HTML documents for certain languages may exacerbate the difficulty of text content extractions (e.g., parallel text extraction). For instance, "Grade 8 students" is written under one paragraph tag <p>"Grade 8 students"</p>, while its translation in French "élèves de $8^e$ année" may be formatted into <p>"elèves de 8"<sup>e</sup>"année"</p>, where a <sup> tag is introduced additionally to realize the right superscript. Such formatting tags may render the text content extraction by tags meaningless.

The paragraph-based method 130 may provide solutions for the above-mentioned challenges by improving the tag-based method 110 in various aspects. For example, in order to keep the full linguistic context of the extracted texts from the source and target HTML documents 112A, B, the paragraph-based method 130 may extract textual contents (at block 132) at paragraph level 120 rather than at tag level. To implement this method, although the HTML structures of some webpages may be complicated and various, the majority of the webpages may be in two cases. In the first case, split paragraphs are inserted under the paragraph tags <p> such that the paragraph-based method 130 may extract and concatenate the texts of all the nodes nested under one paragraph tag to rebuild a complete paragraph. In the second case, the texts are organized in a table format such that the paragraph-based method 130 may extract each cell (e.g., <td> tag in HTML document) of the table as one linguistic paragraph. Certain examples of extracting a complete paragraph in a HTML tree in these two cases will be illustrated in following sections with respect to FIG. 6.

After extracting all the paragraphs, the paragraph-based method 130 may use an alignment algorithm (e.g., bilingual alignment algorithm 124) to obtain parallel sentence-aligned pairs, thereby improving the accuracy of replacement. For example, the paragraph-based method 130 may perform an alignment between English texts and French texts (at block 134) using the alignment algorithm and generate the parallel sentence-aligned pairs.

In an embodiment, the paragraph-based method 130 may mix the source and target HTML documents 112A, B at the sentence level. Next, the paragraph-based method 130 may extract all the paragraphs under the paragraph tags <p> from the source and target HTML documents 112A, B and generate two corpuses: a source corpus $C_s$ and a target corpus $C_t$, respectively. Moreover, the paragraph-based method 130 may leverage a sentence aligner to identify all bilingual equivalent sentence pairs S (each including a source sentence $S_s$ and a target sentence $S_t$). Furthermore, the paragraph-based method 130 may iterate each sentence $S_s$ and replace the $S_s$ by the corresponding $S_t$ with an assigned exchange probability less than a predefined threshold p, where $p \in [0, 1]$ (at block 136). After replacement, the paragraph-based method 130 may generate a mixed HTML document (at block 138).

For the paragraph-based method 130, the choice of the alignment algorithm (e.g., sentence-level alignment algorithm) is important (e.g., to the final quality of the generated corpuses $C_s$ and corpus $C_t$). Certain conditions may be considered for choosing the alignment algorithm. First, the alignment algorithm may be able to match one-to-many, many-to-one and many-to-many sentence correspondences among different languages. Second, the alignment algorithm may may have desired turnaround time such that it may be adapted to long web pages with a large amount of texts. Third, the accuracy of the alignment algorithm may not be affected significantly by the length of the paragraphs, because the length of extracted texts may be various.

In an embodiment, the paragraph-based method 130 may use a multilingual sentence aligner (e.g., Bertalign). For example, the multilingual sentence aligner may leverage a pre-trained multilingual language model (e.g., LaBSE) to embed source and target sentences into vectors such that the semantic similarity of the sentences in different languages may be calculated. The multilingual sentence aligner may follow a two-step algorithm based on dynamic programming: 1) using the LaBSE to find one-to-one alignments by calculating the most similar pairs among all the sentence embeddings; 2) using the one-to-one alignments as anchor points to reduce a search domain and find all the valid one-to-many, many-to-one, many-to-many relations, including the sentence correspondences among different languages.

Additionally, or alternatively, using the multilingual sentence aligner, the paragraph-based method 130 may mix the text at word level. For example, based on the source and target corpuses $C_s$ and $C_t$, for each sentence pair S ($S_s$, $S_t$), the paragraph-based method 130 may split the $S_s$ and $S_t$ into two sets of word lists $W_s$ and $W_t$ and use a word aligner to get a word-aligned pair W ($W_s$, $W_t$). The paragraph-based method 130 may iterate through the $W_s$. For each word $w \in W_s$, the paragraph-based method 130 may randomly replace w with a corresponding $w' \in W_t$ and generate a cross-lingual mixed word list $W_{mixed}$. Finally, the paragraph-based method 130 may concatenate the $W_{mixed}$ to generate a new mixed paragraph and replace the previous raw text in a single language with cross-lingual mixed texts. After replacement, the paragraph-based method 130 may generate a mixed HTML document (at block 138).

Although the source and target HTML documents described herein are related to the English and French, it should be noted that, in other embodiments, the AI-driven document analysis system may process documents in other languages (e.g., German, Spanish) using the models (e.g., LayoutXLM models or other suitable models) retrained by training data in the other languages.

With the preceding in mind, certain examples associated with technologies and terms, such as those related to the AI-driven document analysis system 12 use different methods (e.g., tag-based method 110, paragraph-based method 130) for text content extraction and replacement, are provided below to impart additional familiarity and understanding with respect to analyzing and interpreting energy industry domain-specific documents (e.g., PDF files) in various languages, and to provide useful real-world context for other aspects of the present disclosure.

Figure 4:
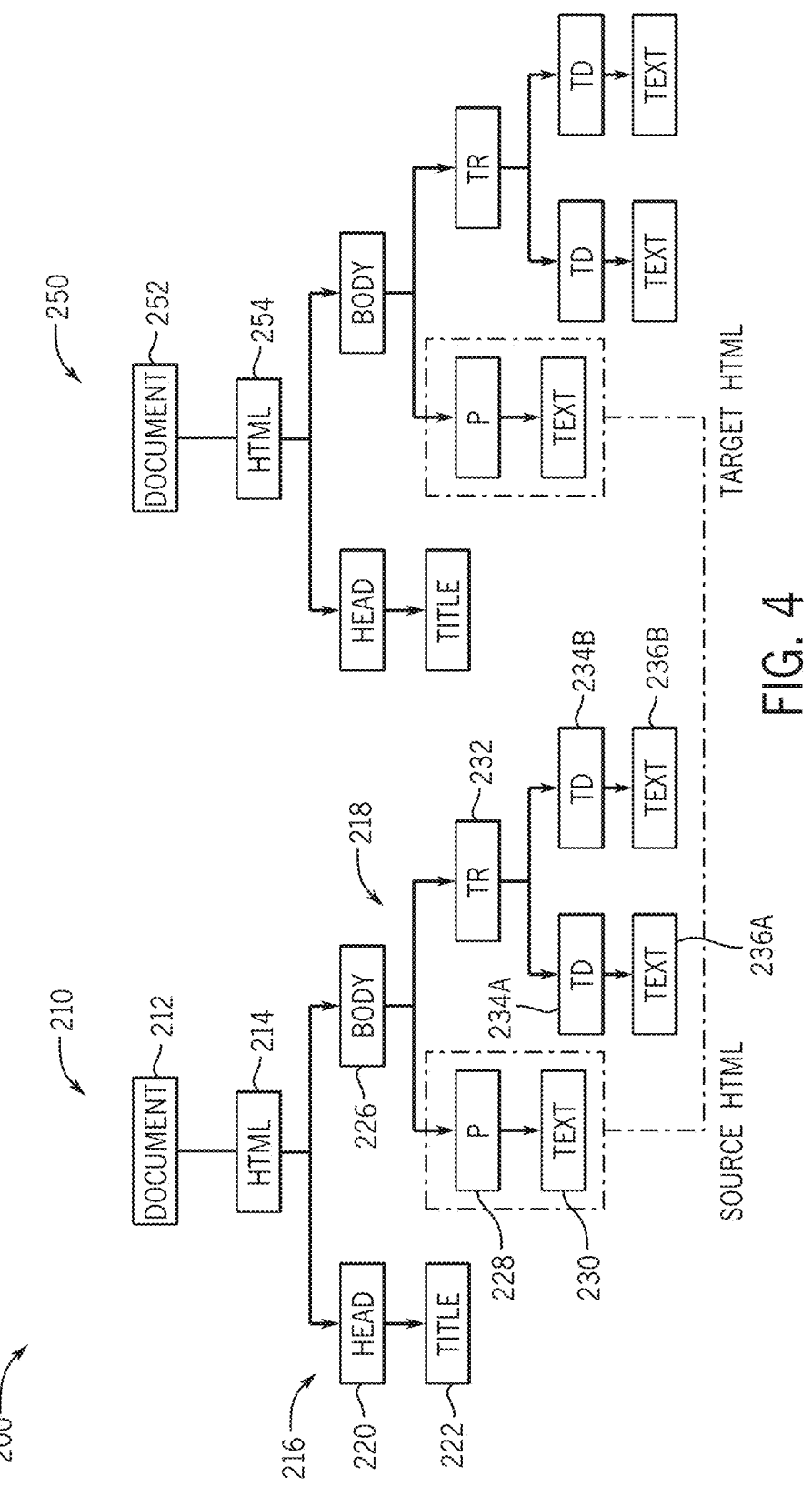
FIG. 4 depicts examples of source and target HTML trees having same tree structures, based on which the tag-based method of FIG. 3 may be used, in accordance with embodiments of the present disclosure.

FIG. 4 depicts examples of source and target HTML trees 210 and 250 sharing same tree structures, based on which the tag-based method 110 may be used. The source and target HTML trees 210 and 250 may correspond to a pair of webpages associated with an aligned English-French website URL pairs. The source HTML tree 210 includes a source HTML document element 212 that declares a version of the HTML used in the source HTML document element 212. The source HTML document element 212 includes a source HTML element 214. The source HTML element 214 may contain attributes (e.g., document type definition (DTD)) that govern the source HTML document 212.

The source HTML element 214 includes a document head 216 and a document body 218. The document head 216 includes a head element 220 and a title element 222. For example, the head element 220 may include information associated with the source HTML document element 212, such as a title, keywords that may be useful for searching, and other information that may not be considered as document contents. The title element 222 may include information used to identify the documents contents.

The document body 218 includes a body element 226. The body element 226 contains the document contents, such as texts, images, colors, graphics, and the like. The body element 226 includes a paragraph element 228 representing a paragraph. The paragraph may include various structural grouping of related document contents, such as a text element 230, image elements, or other elements (e.g., form fields). The body element 226 also includes a table row element 232 that defines a row of cells in a table. The row of cells may be established using a mix of data cell elements 234A, 234B. Each of the data cell elements 234A, 234B includes one or more text elements (e.g., 236A, 236B).

Similarly, the target HTML tree 250 includes a target HTML document element 252 that declares a version of the HTML used in the target HTML document element 252. The target HTML document element 252 includes a target HTML element 254. The target HTML element 254 may contain attributes (e.g., document type definition (DTD)) that govern the target HTML document 252. The target HTML element 254 includes various elements (e.g., head, title, body, paragraph, table row, table cell elements) in the structure similar to the source HTML element 214.

Figure 5:
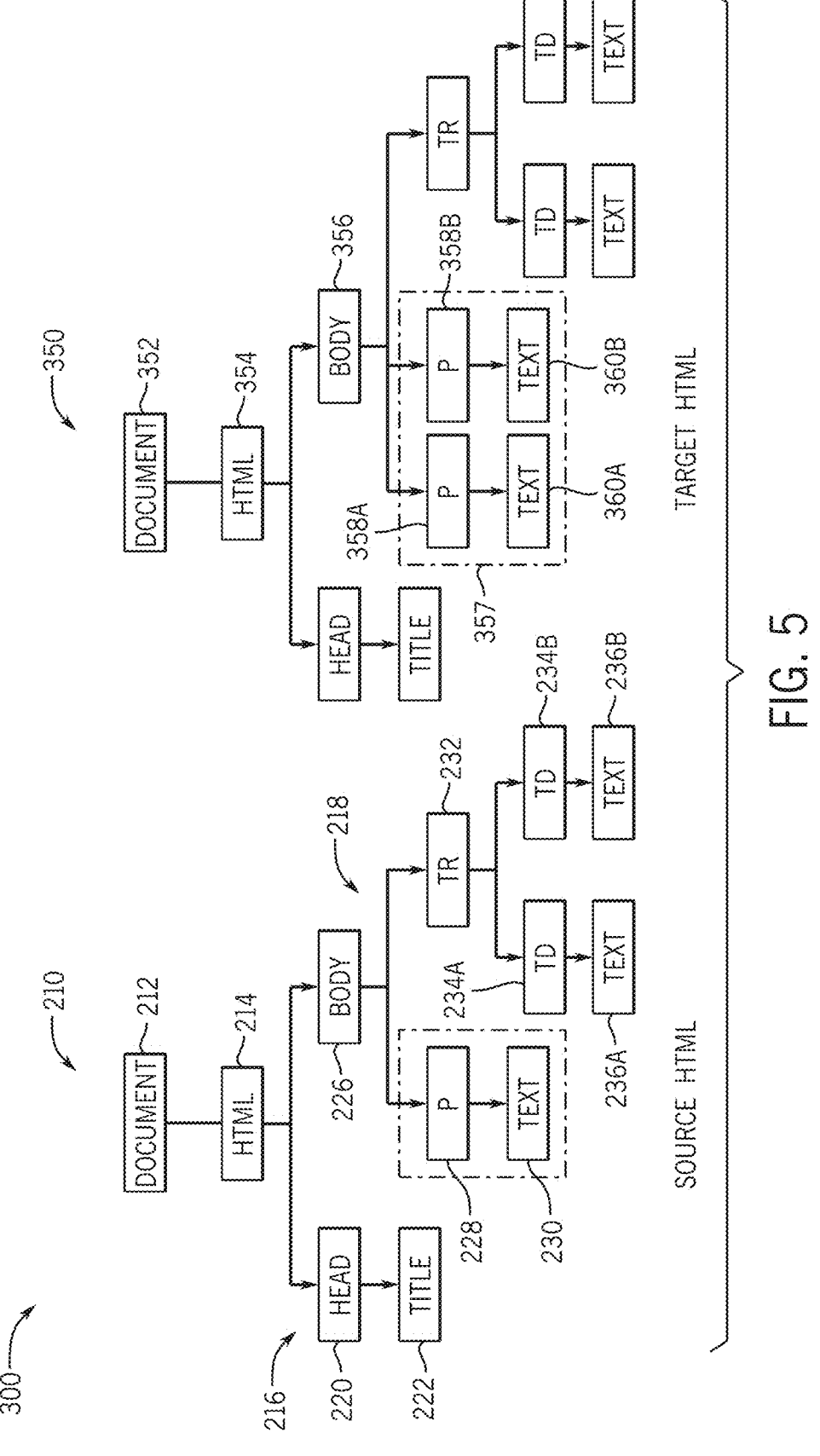
FIG. 5 depicts examples of source and target HTML trees having different tree structures, based on which the paragraph-based method of FIG. 3 may be used, in accordance with embodiments of the present disclosure.

FIG. 5 depicts examples of source and target HTML trees having different tree structures, based on which the paragraph-based method 130 of FIG. 3 may be used. The source HTML tree 210 and a target HTML tree 350 are used in present examples. The target HTML tree 350 includes a target HTML document element 352 including a target HTML element 354. The target HTML element 354 includes a body element 356. Different from a corresponding portion 227 (including the paragraph element 228 that includes the text element 230 in English) in the body element 226 in the source HTML element 214, the body element 356 includes a portion 357 (e.g., containing same contents as the portion 227 but in French) including two paragraph elements 358A, 358B, each including a text element 360A, 360B, respectively. In present examples, the content of the source HTML document element 212 associated with a source language webpage does not correspond exactly to the content of the target HTML document element 352 associated with a target language webpage. Therefore, the presence of some added or missing parts (e.g., two paragraph elements 358A, 358B) creates certain difficulty to directly extract aligned text pairs tag by tag using the tag-based method 110. In comparison, the paragraph-based method 130 may extract textual contents at paragraph level rather than at tag level to avoid or reduce such difficulty and improve accuracy of the content extraction.

Figure 6:
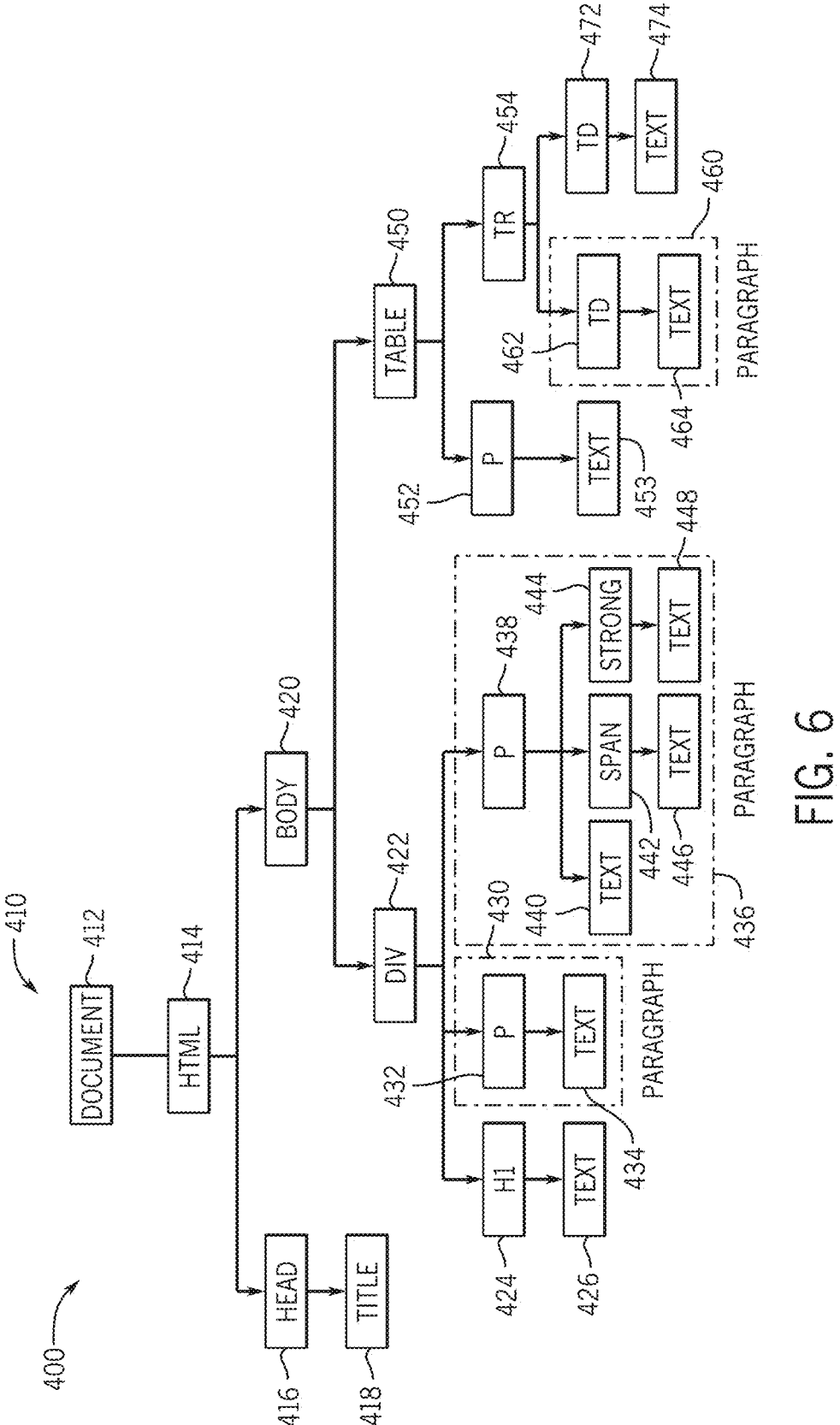
FIG. 6 depicts an example HTML tree that may be used in the paragraph-based method of FIG. 3 for extracting a complete paragraph in the HTML tree, in accordance with embodiments of the present disclosure.

FIG. 6 depicts a HTML tree 410 that may be used in the paragraph-based method 130 of FIG. 3 for extracting a complete paragraph in the HTML tree 410. The HTML tree 410 includes a HTML document element 412 and a HTML element 414. The HTML element 414 includes a head element 416 including a title element 418 and a body element 420 having a more complex structure than the body element 356 in FIG. 5. For example, the body element 420 includes a div element 422 that defines a division (or a section) in the HTML document element 412. The div element 422 may be used as a container for the HTML document element 412. The div element 422 includes a h1 element 424 including a text element 426 and used to mark up a web page title. The div element 422 also includes paragraph sections 430 and 436. The paragraph section 430 includes a paragraph element 432 including a text element 434, and the paragraph section 436 includes a paragraph element 438, which includes a text element 440, a span element 442 and a strong element 444. The span element 442 is a generic inline container element (e.g., containing a text element 446 for styling purposes or for adding attributes to the text element 446 without creating a new line of content). The strong element 444 is used to define text with strong importance (e.g., containing a text element 448 displayed in bold).

Additionally, the body element 420 includes a table element 450 including table cells inside rows and columns. The table element 450 includes a paragraph element 452 including a text element 453. The table element 450 also includes a table row element 454 including data cell section, such as a data cell section 460. Each data cell section includes a data cell element in an HTML table. For example, the data cell section 460 includes a data cell element 462 including a text element 464. The table row element 454 also includes a data cell element 472 including a text element 474.

For the HTML tree 410 having complex structures with mixed sections, such as the paragraph sections 430 (containing normal text), 436 (containing styling text and/or text with strong importance), and 469 (containing table content), using the tag-based method 110 may be difficult. In such cases, the paragraph-based method 130 may provide solutions for keeping the full linguistic context of the extracted texts by extracting textual contents at paragraph level rather than at tag level. For example, the paragraph-based method 130 may extract and concatenate the texts of all the nodes nested under one paragraph tag to rebuild a complete paragraph. For text organized in a table format (e.g., in the table element 450), the paragraph-based method 130 may extract each data cell (e.g., data cell element 462 or 472) of the table as one linguistic paragraph.

Figure 7:
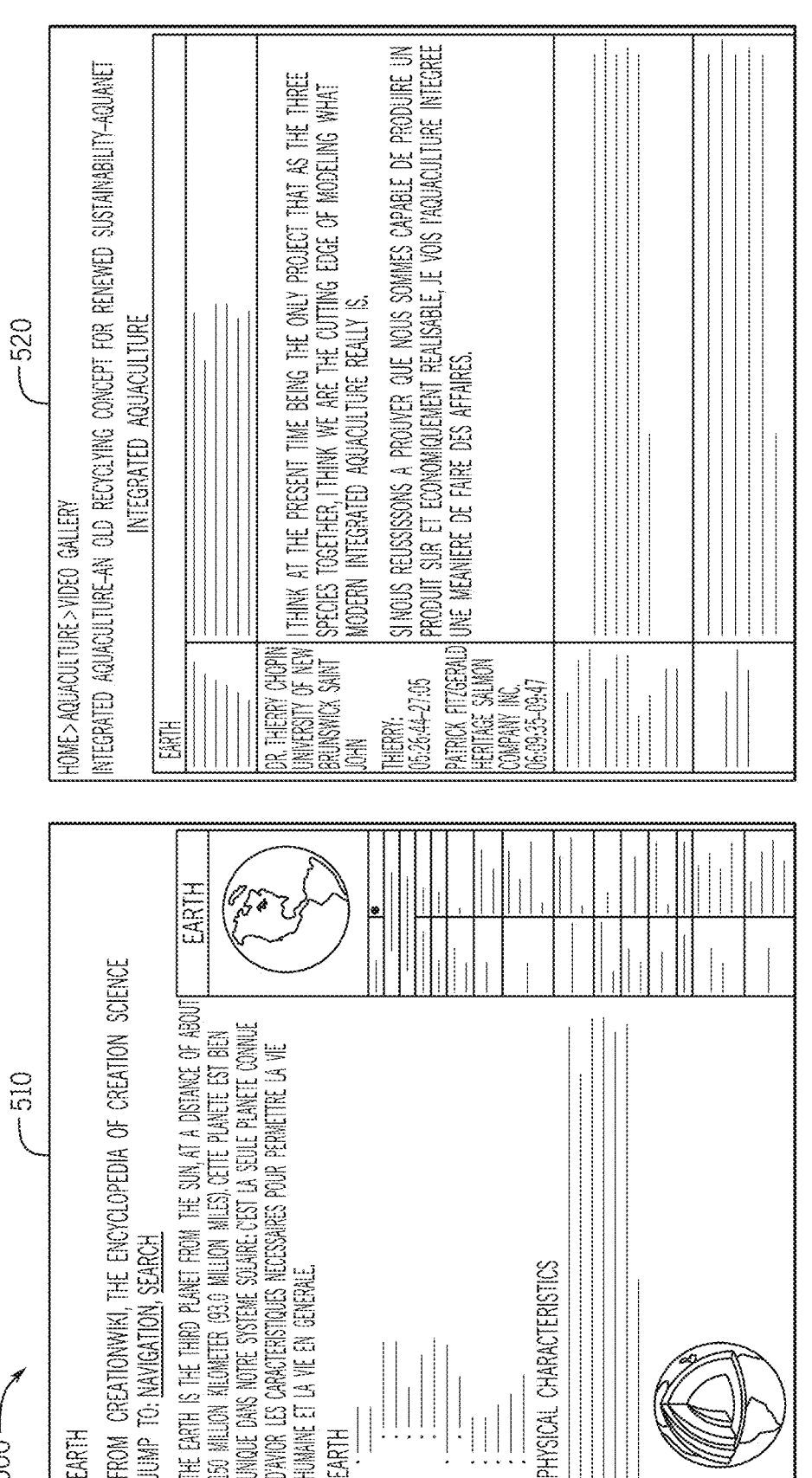
FIG. 7 depicts examples of cross-lingual mixed documents generated using the paragraph-based method of FIGS. 5-6, in accordance with embodiments of the present disclosure.

FIG. 7 depicts examples 500 of cross-lingual mixed documents generated using the paragraph-based method 130 of FIGS. 5-6. In these examples, the AI-driven document analysis system 12 may use the paragraph-based method 130 to mix each of the 1624 English-French document pairs in the WMT-16 dataset at the sentence level. For each input document, the paragraph-based method 130 is used to generate a complementary pair of mixed documents. For example, for each sentence in one document, the AI-driven document analysis system 12 may find its corresponding translation in its complementary document. At the same time, AI-driven document analysis system 12 may discard a small number of files that may not be mixed by the paragraph-based method 130, and obtain 1307 pairs of sentence-level mixed documents. In addition, the paragraph-based method 130 may be extended to other languages (e.g., hundreds of different languages).

Examples 500 illustrate sentence-level mixed documents generated by the AI-driven document analysis system 12 using the paragraph-based method 130. For example, a diagram 510 shows a webpage containing textual information organized as split paragraphs under paragraph tags. Another diagram 520 shows a webpage containing textual information organized as table format under cell tags. Using the paragraph-based method 130, the AI-driven document analysis system 12 extracts and mixes the text content at the sentence level.

With the preceding in mind, material related to an implementation for adapting the cross-lingual mixed documents (or datasets) to the LayoutXLM model is provided below to impart some familiarity with implementing the AI-driven document analysis system 12 and provide useful real-world context for other aspects of the disclosure, such as model architecture, data preparation, and model pre-training.

The model architecture may include same architecture as LayoutXLM or LayoutLMv2, which consists of multiple layers of multi-modal Transformer encoders. Three types of input embeddings are defined in the model: 1) text embedding is a sum of three parts: token embeddings are the vocabulary IDs for tokens, which are segmented and tokenized by a tokenizer; 1D positional embedding represents the index of each token; and segment embeddings are sometimes employed to allocate different text segments. 2) visual embedding use a visual encoder to encode the entire document image into a sequence; 3) layout embedding is a 2D positional embedding, which represents the corner coordinates of the bounding box for each token.

The data preparation may include a document image cropping process that replicates the training process of LayoutXLM with additional preprocessing over currently available document datasets. The data preparation may include document image cropping. For example, considering the maximum sequence length of LayoutXLM model is limited to 512, for certain document in the document datasets, there is a long portion of text that may not be processed by the model. Therefore, in order to take full advantage of the contextual information provided by a document, the AI-driven document analysis system 12 may use a sliding window algorithm to crop the document image into several pieces. For a document image with a size of (image length, image width), the AI-driven document analysis system 12 may use a sliding windows of size (image width, image width) with an overlap of 0.25*image width to crop the document image, such that no contextual information is discarded during this process.

The data preparation may also include an OCR & Tokenization process. For example, the AI-driven document analysis system 12 may use Python library (e.g., Pytesseract) to apply Google's Tesseract tool to the document image and extract the words as well as their corresponding bounding boxes. At the same time, the row number to which each word belongs may also be recognized. These row number may be used to mark and cover the lines. The AI-driven document analysis system 12 may use a LayoutXLM Tokenizer (e.g., a wrapper of SentencePiece as a tokenizer with a vocabulary from Fairseq) to split the words into sub token units and then tokenize them. At the same time, some special tokens (e.g., <s>, <\s>, <pad>, <unk>, <mask>) may be added to the vocabulary. Additionally, files with a token number less than 200 may be discarded.

In the model pre-training stage, certain pre-training objectives are used to train the layoutXLM, such as a Masked Visual-Language Modeling (MVLM), a Text Image Alignment (TIA), and a Text Image Matching (TIM). For MVLM, a random mask 15% of textual tokens is applied, 80% of which are replaced by <mask>, 10% are replaced by a token randomly selected from the vocabulary, 10% remains unchanged. At the same time, a different mask is added to the corresponding position of these words in the document image. For TIM, 15% of the lines are randomly chosen and covered. Additionally, to avoid contradiction, the tokens that are masked in MVLM may not be taken into account when computing the loss. For TIA, 15% document images are randomly replaced by the other documents randomly chosen from the dataset.

Considering the pre-training stage is a multitask training process, the full pre-training objective function is defined as a sum of three parts, as shown in equation 1:

$$\text{loss} = \text{loss}_{MVLM} + \text{loss}_{TIA} + \text{loss}_{TIM}. \tag{Equ. 1}$$

Certain fine-tuning and evaluation processes are used to validate the effectiveness of using mixed document dataset to pre-train the LayoutXLM model. For example, the LayoutXLM model may be fine-tuned and evaluated on the form understanding task using FUNSD and XFUND.

Two pre-training datasets are used here as a comparative group: a WMTMIXED dataset containing 1307 complementary pairs of mixed documents and a WMTRAW dataset containing 1307 pairs of English-French raw documents.

For fine-tuning datasets, considering the cross-lingual dataset is mixed with English and French, the pre-trained LayoutXLM model is fine-tuned and evaluated on two benchmark datasets for form an understanding task. A FUNSD dataset is used as an evaluation dataset composed of 199 English forms in scanned version, among which 149 for training and 50 for evaluation. A XFUND dataset extends the FUNSD dataset in 7 other languages (Chinese, Japanese, Spanish, French, Italian, German, and Portuguese) for multilingual form the understanding task. For example, the pre-trained LayoutXLM model may be tested using the French version with 202 forms for fine-tuning and 71 for evaluation.

Certain test results (e.g., the model pre-training, the model fine-tuning) are provided in following sections with respect to the testing and implementation of the AI-driven document analysis system 12. For example, some tests use the multilingual pre-trained backbone LayoutXLMBASE (e.g., Huggingface), which includes a 12-layer 12-head transformer encoder with hidden size d=768.

In an embodiment, the pre-training uses WMTMIXED and WMTRAW respectively to pre-train a LayoutXLM backbone with an initialization including text embedding initialized by InfoXLM, visual embedding initialized by Mask-CNN, and the other parameters initialized randomly. Considering the limited size of the training dataset, the LayoutXLMBASE backbone pre-trained on 30 million multilingual documents is used and then a continuous pre-training on the cross-lingual mixed datasets 56. A comparison We compare The evaluation results before and after the continuous training are compared to validate the effectiveness of the pre-training. Certain parameters are used in the pre-training. For example, the number of epochs set from 6 to 10, batch size set as 2, and implement Adam as optimizer with $\beta_1$=0.9, $\beta_2$=0.999, learning rate=5e$^{-5}$.

In an embodiment, the two benchmark datasets, XFUND and FUNSD are tested on semantic entity recognition (SER) task, where each token is assigned to one of the semantic entity classes. Thus a token classification head layer may be built to predict the BIO tags for each entity category. A language-specific fine-tuning may be conducted respectively on these two benchmark datasets for 6 epochs with batch size as 2. The precision, recall, F1 score and accuracy may be calculated to evaluate the pre-trained LayoutXLM model.

Tables 1. and 2. show the evaluation results with XFUND and FUNSD on recognition (SER) task before and after the continuous training on the pre-trained LayoutXLMBASE. For example, Table 1. shows fine-tune and evaluation results based on the semantic entity recognition (SER) with the XFUND dataset (in French). Table 2. shows fine-tune and evaluation results based on the semantic entity recognition (SER) with the FUNSD dataset (in English)

TABLE 1

Fine-tune and evaluation on semantic entity recognition(SER) with XFUND(French)

| Model Backbone | Continuous Pre-training | Precision | Recall | F1 score | Accuracy |
|---|---|---|---|---|---|
| Pretrained LayoutXLM$_{BASE}$ | x → baseline | 0.7699 | 0.7480 | 0.7586 | 0.7828 |
| | WMT16$_{MIXED}$ (6 epochs) | 0.7509 | 0.7774 | 0.7639 | 0.7701 |
| | WMT16$_{MIXED}$ (10 epochs) | 0.7799 | 0.7166 | 0.7460 | 0.7676 |
| | WMT16$_{RAW}$ (6 epochs) | 0.8062 | 0.6892 | 0.7431 | 0.7723 |
| | WMT16$_{RAW}$ (10 epochs) | 0.7136 | 0.7283 | 0.7195 | 0.7340 |

TABLE 2

| Fine-tune and evaluation on semantic entity recognition(SER) with FUNSD(English) | | | | | |
| --- | --- | --- | --- | --- | --- |
| Model Backbone | Continuous Pre-training | Precision | Recall | F1 score | Accuracy |
| Pretrained | x → baseline | 0.7197 | 0.7957 | 0.7558 | 0.7685 |
| LayoutXLM$_{BASE}$ | WMT16$_{MIXED}$ (6 epochs) | 0.6869 | 0.7584 | 0.7208 | 0.7565 |
| | WMT16$_{MIXED}$ (10 epochs) | 0.6632 | 0.7531 | 0.7053 | 0.7533 |
| | WMT16$_{RAW}$ (6 epochs) | 0.6722 | 0.7124 | 0.6917 | 0.7302 |
| | WMT16$_{RAW}$ (10 epochs) | 0.6347 | 0.7150 | 0.6718 | 0.7256 |

For both of these two datasets, key-value pairs are exacted from the forms and annotated manually by four categories ("Header", "Question", "Answer" and "Other") with seven subclasses: "O", "B-Header", "I-Header", "B-Question", "I-Question", "B-Answer" and "I-Answer".

The results shown in Tables 1. And 2. demonstrate that with certain limitations (e.g., the pre-training dataset with a thousand documents) the results obtained are below the baseline and decrease as the number of epochs increases. This may be explained by the fact that the continuous training on a much smaller dataset may reduce significantly the generalization ability of pre-trained model. Although the size of the pre-training dataset may affect the model performance achieved by training with a large-scale dataset and the results obtained after the continuous pre-training with the WMTMIXED dataset and WMTRAW dataset are both regressive, and the F1 score obtained by the WMTMIXED dataset outperforms that of the WMTRAW dataset. This shows that the cross-lingual mixed datasets 56 has a positive impact on helping the LayoutXLM model better establish cross-linguistic relations compared with using the data in separate languages. It should be noted that the results on the XFUND dataset obtained after continuous training for 6 epochs using cross-lingual mixed dataset outperforms the baseline method.

To evaluate certain impacts on document representation and alignment of the cross-lingual document embedding space by training the model with mixed datasets, additional evaluation tasks may be performed, such as an evaluation task based on document similarity. For example, the evaluation task may start with an output layer of the LayoutXLM model, using two methods to characterize one document image by an embedding vector: 1) similar to common NLP, an output vector of classification token <s> may be used to represent the whole textual sequence; 2) an output embedding of <s> token and the visual embedding of the whole document image may be concatenated to represent the document. Therefore, each document may be represented by a specific vector based on these two methods.

In an embodiment, a WMT16RAW dataset with 1307 parallel EN-FR pairs may be used to calculate a document similarity matrix among input documents. For example, each of the input documents may be represented by a document embedding vector. For any document in English, the document similarity matrix may be calculated with all the documents in French and finally obtain a similarity matrix, in which the horizontal axis represents the French document ID and the vertical axis represents the English document ID. This means that in a similarity matrix M$_{sim}$, any value sij appearing at position (i, j) represents the similarity between the i-th French document and the j-th English document.

Figure 8:
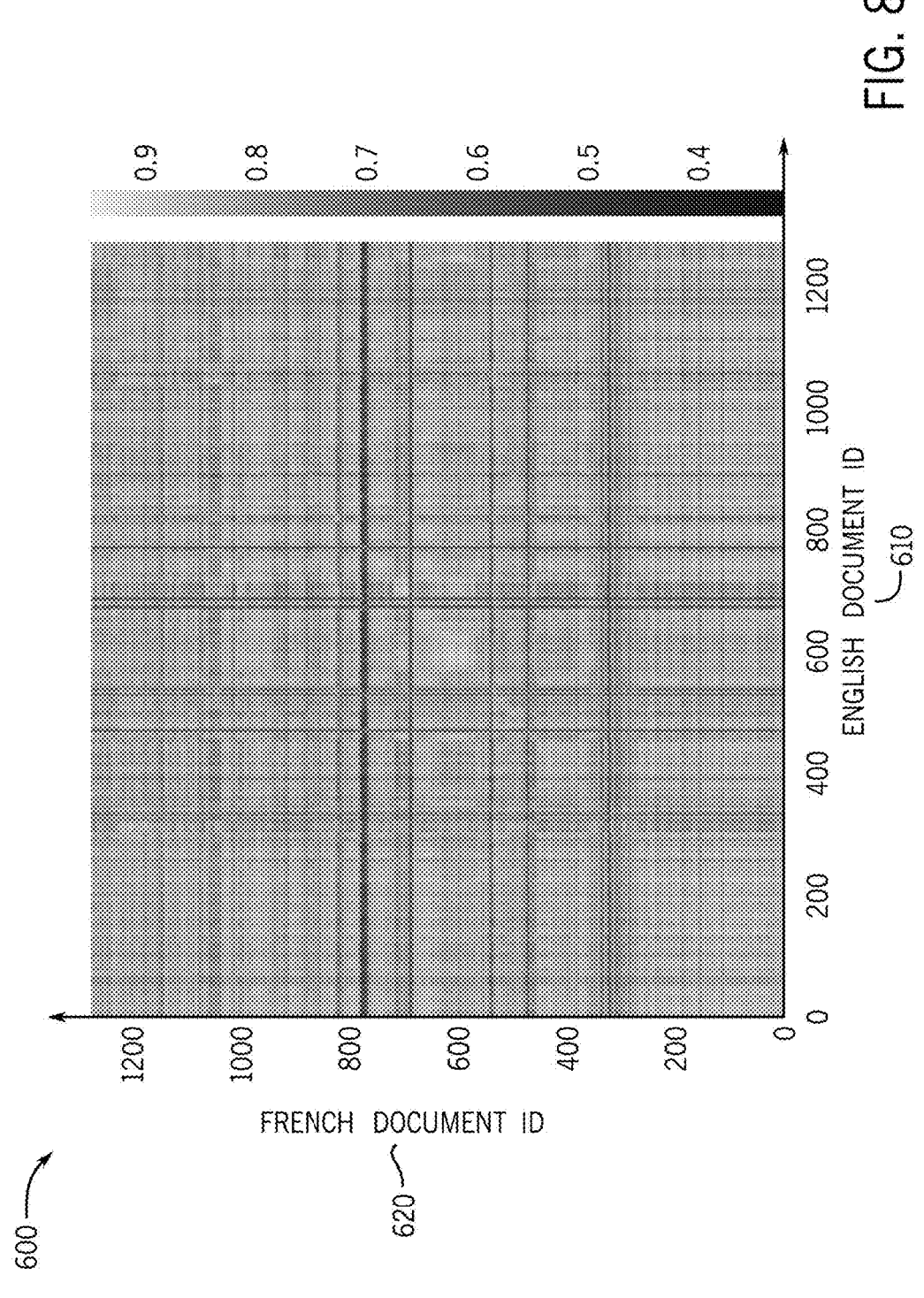
FIG. 8 depicts an example representation of a similarity matrix that may be used in the AI-driven document analysis system of FIG. 2, in accordance with embodiments of the present disclosure.

For example, FIG. 8 depicts an example representation of a similarity matrix that may be used in the AI-driven document analysis system 12 of FIG. 2. The example representation of the similarity matrix shows a distribution 600 of the similarity matrix. The distribution 600 shows a presence of diagonal, which implies that the parallel EN-FR documents pairs (with English document ID 610 and French document ID 620) have higher similarity. The distribution 600 also shows an axisymmetry when taking the diagonal as the axis, which indicates that the similarity between the i-th French document and the j-th English document sij and the similarity between the j-th French document and the i-th English document Sij are close. The distribution 600 demonstrate that the document embedding generated with the pre-trained LayoutXLM model takes cross-language information into consideration.

Based on the distribution 600, certain evaluation metrics may be developed for further evaluation. In one embodiment, a cross-lingual representativeness (CLR) may be used to define model's ability to characterize the documents in a better cross-linguistic way. Considering the fact that the similarity between the i-th French document and the j-th English document $s_{i,j}$ and the similarity between the j-th French document and the i-th English document $s_{j,i}$ may be closer if the model better learns the cross-lingual information, the CLR may be defined by equation 2:

$$CLR = \frac{|Msim - M^T sim|}{n(n-1)}, \qquad \text{Equ. 2}$$

where M$_{sim}$ is the similarity matrix, M$^T$$_{sim}$ is the transpose of M$_{sim}$, n is the dimension of the matrix. The smaller the CLR, the better the model learns cross-lingual relations.

In one embodiment, a parallel document distinguishability (PDD) may be used. The PDD may be defined by equation 3.to defined by equation 3:

$$PDD = \frac{\sum_{k \in n} Si, i}{n} - \frac{\sum_{k \in n} \sum_{j \in n} Si, j - \sum_{k \in n} Si, i}{n(n-1)}, \qquad \text{Equ. 3}$$

$$\forall\, Si, j \in Msim,$$

where the first term represents the average of similarity for all n pairs of English-French documents and the second term represents the average of similarity for all the rest non-parallel documents. The PDD may be used to evaluate the ability of the model to find correct parallel document pairs among a large number of documents.

In one embodiment, a translated pairs top N accuracy (N$_{acc}$) may be used to calculate a proportion of the English documents including parallel French document belongs to its N (e.g., N is 10) top most similar French documents.

The evaluation results based on these three metrics (CLR, PDD, AND $N_{acc}$) are presented in table 3.

TABLE 3

| Evaluation metrics on document similarity matrix | | | | |
|---|---|---|---|---|
| Continuous Pre-training | Embedding | CLR | PDD | $N_{Acc}$ |
| x→baseline | <s> | 0.0412 | 0.0429 | 0.3532 |
|  | <s> + visual | 0.0445 | 0.0460 | 0.4072 |
| WMT16$_{MIXED}$ | <s> | 0.1730 | 0.0128 | 0.1457 |
|  | <s> + visual | 0.1279 | 0.0009 | 0.0540 |
| WMT16$_{RAW}$ | <s> | 0.0735 | 0.0566 | 0.2381 |
|  | <s> + visual | 0.0706 | 0.0645 | 0.2991 |

In certain embodiments, the mixed document dataset used for training may be designed to be independent of the choice of embedding learning algorithm. In some cases, an objective function and labels may not be optimized for cross-lingual learning. For example, the Masked Visual-Language Modeling (MVLM) may work correctly with one single language as input. For another example, when training a mixed text build the maison, the word house, the equivalent word of maison, is not considered to be correct in this case. This may introduce a bias and have an effect on the accuracy of the prediction. To improve this, a method using cross-lingual objective or by including a cross-lingual term into the objective function may be used.

The systems and methods described in present disclosure provide a cross-lingual PDF analysis and translation system specifically designed for the energy industry. The cross-lingual PDF analysis and translation system uses various methods (e.g., tag-based or paragraph-based document extraction and mixing) to create a cross-lingual mixed document dataset by modifying HTML files from multilingual web pages. The cross-lingual mixed document dataset is used to retrain the LayoutXLM model, enabling the LayoutXLM model to further build cross-lingual relations by evaluating the model on various form understanding benchmarks.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A system, comprising:
a network interface configured to retrieve a first plurality of multilingual documents and a second plurality of multilingual documents;
a document generation component configured to generate a cross-lingual mixed document based on the first plurality of multilingual documents, wherein the document generation component is configured to generate the cross-lingual mixed document using a paragraph-based document extraction and mixing process, comprising:
selecting, from the first plurality of multilingual documents, a source document in a source language and a target document in a target language, wherein the source document corresponds to a source HTML document tree and the target document corresponds to a target HTML document tree;
extracting textual contents at a paragraph level by iterating simultaneously through tree nodes of the source HTML document tree and the target HTML document tree;
concatenating the extracted textual contents associated with the tree node nested under one paragraph tag to rebuild a complete paragraph;
applying an alignment algorithm between the extracted textual contents in the source language and the extracted textual contents in the target language to obtain parallel sentence-aligned pairs;
mixing the source document and the target document at a sentence level based on the parallel sentence-aligned pairs;
extracting paragraphs under paragraph tags from the source document and the target document to generate a source corpus and a target corpus;
leveraging a sentence aligner to identify bilingual equivalent sentence pairs each comprising a source sentence and a target sentence;
iterating the bilingual equivalent sentence pairs to replace each sourced sentence by a corresponding target sentence with an assigned exchange probability less than a predefined threshold; and
outputting a cross-lingual HTML document;
an artificial intelligence (AI) driven document processing component configured to:
retrain a pre-trained machine learning model to learn cross-lingual relations based on the cross-lingual mixed document; and
translate the second plurality of multilingual documents based on the cross-lingual relations; and
one or more task-specific components configured to complement the AI-driven document processing component to implement one or more specific tasks.

2. The system of claim 1, wherein the first plurality of multilingual documents and the second plurality of multilingual documents comprise domain specific content in a plurality of languages and in a plurality of types comprising emails, forms, receipts, PDF files, Excel files, or other types of scanned or digital versions of documents.

3. The system of claim 2, wherein the domain specific content comprises energy industry multilingual data, wherein the energy industry multilingual data comprises energy industry related terminology, diagrams, special format, tables, or special units and notations.

4. The system of claim 1, wherein the pre-trained machine learning model comprises a LayoutXLM model.

5. The system of claim 4, wherein the LayoutXLM model is pre-trained using a plurality of multilingual documents comprising a plurality of languages, wherein the plurality of languages comprises at least Chinese, Japanese, Spanish, French, Italian, German, and Portuguese.

6. The system of claim 4, wherein the pre-trained machine learning model is retrained to learn cross-lingual relations based on textual information from the cross-lingual mixed document and layout information extracted from the plurality of multilingual documents.

7. The system of claim 1, wherein the one or more task-specific components comprises a document analysis element configured to identify and extract energy domain-specific contents from the first plurality of multilingual documents and the second plurality of multilingual documents, wherein the energy domain-specific contents comprise energy field terminology and vocabularies, diagrams and tables, specialized formatting, notations, formulations, and expressions.

8. The system of claim 7, wherein the extracted energy domain-specific contents are stored in a structured format.

9. The system of claim 1, wherein the one or more task-specific components comprises a document classification element configured to assign one or more predefined categories or classes for each document of the first plurality of multilingual documents and the second plurality of multilingual documents.

10. The system of claim 9, wherein the AI-driven document processing component is configured to use the one or more predefined categories or classes to:

organize a collection of energy industry domain-specific documents comprising the first plurality of multilingual documents and the second plurality of multilingual documents;

filter out irrelevant or spam documents from the collection of energy industry domain-specific documents; and route each of the collection of energy industry domain-specific documents to a related section or user within an organization.

11. The system of claim 1, wherein the one or more task-specific components comprises a document translation element configured to:

select one or more target languages; and cause the AI-driven document processing component to translate each of the second plurality of multilingual documents into a respective language of the one or more target languages.

12. The system of claim 11, wherein selecting the one or more target languages is based on one or more criteria comprising user preference or source languages of the second plurality of multilingual documents.

13. The system of claim 12, wherein each of the second plurality of multilingual documents is translated into the respective language of the one or more target languages with the same or similar structured layout comprising position, size, and orientation information of texts, images, tables, and other elements in the second plurality of multilingual documents.

14. The system of claim 1, wherein the paragraph-based document extraction and mixing process comprises:

organizing the extracted textual contents in a table comprising a plurality of data cells; and extracting each data cell of the plurality of data cells as one linguistic paragraph.

\* \* \* \* \*